(12) United States Patent  
Okawa

(10) Patent No.: US 6,617,717 B2
(45) Date of Patent: Sep. 9, 2003

(54) ALTERNATOR

(75) Inventor: Goroku Okawa, Chiryu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/949,753

(22) Filed: Sep. 12, 2001

(65) Prior Publication Data

US 2002/0047485 A1 Apr. 25, 2002

(30) Foreign Application Priority Data

Sep. 21, 2000 (JP) ........................................ 2000-287252

(51) Int. Cl.$^7$ ............................... H02K 9/06; H02K 9/04
(52) U.S. Cl. ..................... 310/59; 310/60 R; 310/62; 310/63; 416/203
(58) Field of Search ............................... 310/51, 62, 63, 310/263, 52, 60 R, 58, 59; 416/203, 223 R, 238

(56) References Cited

U.S. PATENT DOCUMENTS 5,235,229 A    8/1993  Tanaka et al. ................. 310/62
5,763,968 A    6/1998  Hayashi et al. ................ 310/51
6,091,169 A  * 7/2000  Umeda et al. ................. 310/62

FOREIGN PATENT DOCUMENTS

JP    6216776     4/1987   ............ H02K/9/06
JP    6335204    12/1994   ............ H02K/9/06

* cited by examiner

Primary Examiner—Burton Mullins
(74) Attorney, Agent, or Firm—Oliff & Berridge, PLC

(57) ABSTRACT

In an alternator, a pole core has a plurality of claw-pole pieces, and a cooling fan has a plurality of diagonal-flow-type blades and a plurality of centrifugal-flow-type blades. A combination of numbers of the claw-pole pieces and the diagonal-flow-type blades is determined to suppress an interference of wind noises caused by the claw-pole pieces and the diagonal-flow-type blades during operation, such that one of the numbers of the claw-pole pieces and the diagonal-flow-type blades is not divisible by the other and both numbers have no common divisor other than one. Further, a number of the centrifugal-flow-type blades is determined not to be divisible by the numbers of the diagonal-flow-type blades and the claw-pole pieces, and all the three numbers have no common divisor other than one.

6 Claims, 2 Drawing Sheets

ALTERNATOR

CROSS REFERENCE TO RELATED APPLICATION

The present application relates to and incorporates herein by reference Japanese Patent Application No. 2000-287252 filed on Sep. 21, 2000.

BACKGROUND OF THE INVENTION

The present invention relates to an alternator. More particularly, the present invention relates to a three phase alternator having a cooling fan for a vehicle.

In a conventional alternator disclosed in JP-Y2-62-16776, a cooling fan has a plurality of fan blades alternately combined with diagonal-flow-type blades and centrifugal-flow-type blades on an outer circumference thereof. The cooling fan blows cooling air introduced into a housing in an axial direction as well as in a radial outward direction, thereby increasing cooling of a three-phase armature coil, an field coil and resultant output power of the alternator. When the cooling fan is rotated inside a stator, wind noises are caused by the diagonal-flow-type blades and the centrifugal-flow-type blades, and interfere with each other, resulting in wind interference noise. This sound has a specific order of frequency proportional to a divisor or a multiple number of the numbers of the diagonal-flow-type blades or the centrifugal-flow-type blades.

According to U.S. Pat. No. 5,763,968 (JP-A-9-289756), in order to restrict the wind interference noise, the number of diagonal-flow-type blades and the number of centrifugal-flow-type blades are determined not to be divisible by the other number, and to have no common divisor.

However, in JP-Y2-62-16776 and U.S. Pat. No. 5,763,968, each of the diagonal-flow-type blades is positioned between adjacent two shoulder portions of claw-pole pieces which define an air passage, in order to increase cooling capacity. Therefore, during a rotation of a rotor, each of the diagonal-flow-type blades blows cooling air into each air passage and wind noises are increased. Moreover, each of the diagonal-flow-type blades are provided at an axial end of each air passage so that the number of the air passage and the number of the claw-pole pieces are equal. As the number of the diagonal-flow-type blades is equal to the number of the claw-pole pieces, wind noises caused by the diagonal-flow-type blades and the claw-pole pieces interfere with each other. Thus, a wind interference noise harsh on the ears is generated at a specific order of frequency.

SUMMARY OF THE INVENTION

According to one aspect of the present invention, a cooling fan has a plurality of diagonal-flow-type blades and a pole core has a plurality of claw-pole pieces. One of the numbers of the diagonal-flow-type blades and claw-pole pieces is not divisible by the other, and both of the numbers have no common divisor other than one. By arranging a combination of the numbers of the diagonal-flow-type blades and the claw-pole pieces, an interference of wind noises caused by the diagonal-flow-type blades and the claw-pole pieces during operation is restricted, thereby suppressing noises harsh on the ears.

BRIEF DESCRIPTION OF THE DRAWINGS

Other objects, features and advantages of the present invention will become more apparent from the following detailed description made with reference to the accompanying drawings. In the drawings.

DETAILED DESCRIPTION OF PREFERRED EMBODIMENTS

Figure 1:
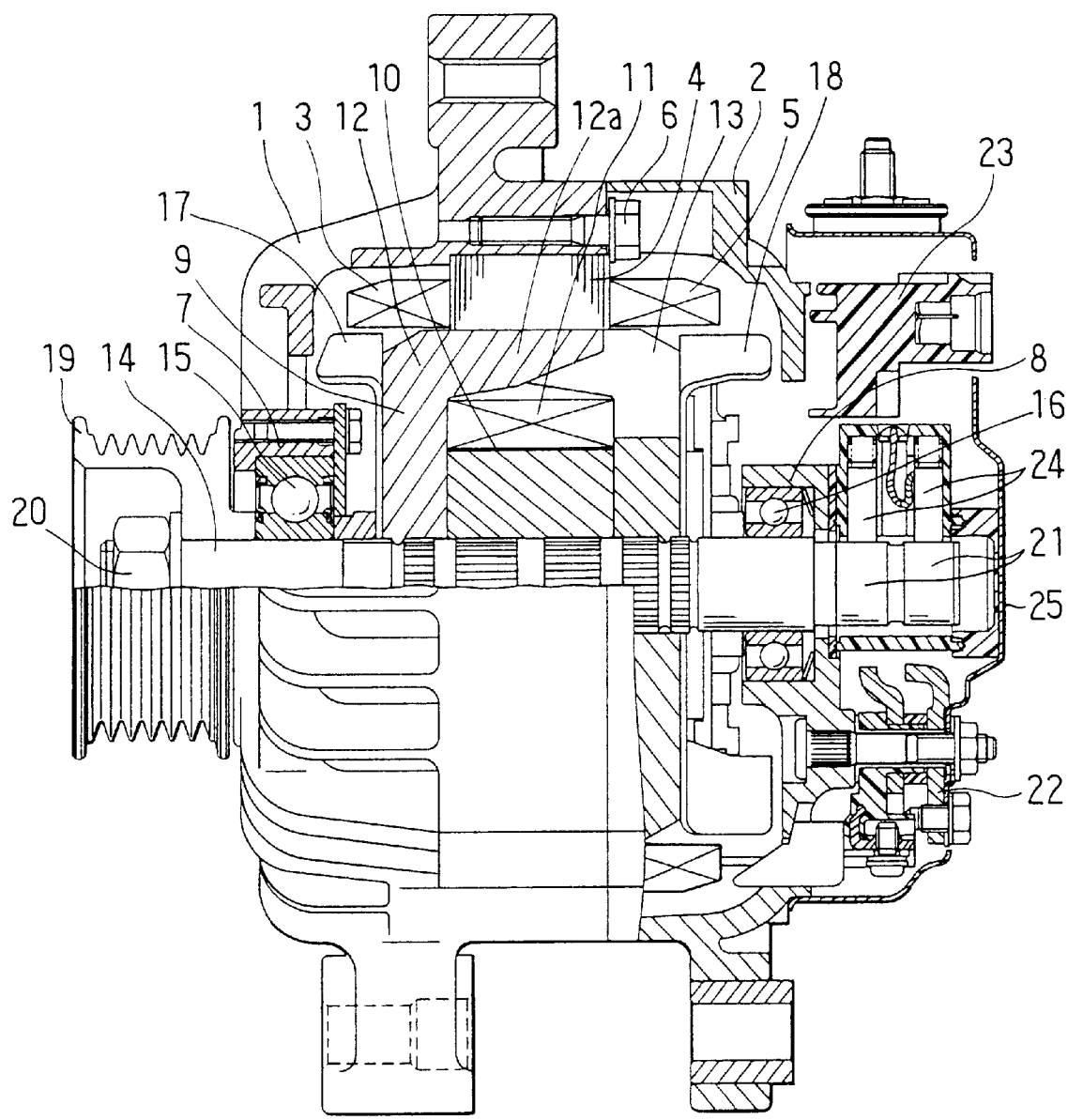
FIG. 1 is a cross-sectional view of an alternator for a vehicle according an embodiment of the present invention.

Referring to FIG. 1 showing an alternator for a vehicle, a front housing 1 and a rear housing 2 are formed into a cup shape by aluminum die-casting. The front housing 1 and the rear housing 2 are fixed to each other by press-contacting openings thereof. A stator 3 is composed of a generally cylindrical stator core 4 made of iron sheets and stator coils 5. The stator core 4 is fixed to the front housing 1 with a metal bolt 6. Cylindrical bearing boxes 7 and 8 are respectively integrated in the front housing 1 and the rear housing 2.

A rotor 9 includes a coil bobbin 10, a field coil 11, pole cores 12, 13, a rotor shaft 14 and the like. The rotor 9 is rotatably held by a pair of bearings 15, 16 respectively fixed in the bearing boxes 7, 8. Cooling fans 17, 18 are provided on axial end surfaces of the pole cores 12, 13, respectively. A pulley 19 is connected to one axial end of the rotor shaft 14 with a nut 20 to be driven by a vehicle engine (not shown). A pair of slip rings 21 is disposed at the other axial end side of the rotor shaft 14. The slip rings 21 are located outside the rear housing 2, to electrically connect to the field coil 11.

Electrical components, such as a commutating device 22, a voltage regulator 23 and brush devices 24, are fixed by a bolt and the like at an end surface outside the rear housing 2 in the axial direction. The electrical components are covered with a rear cover 25.

Figure 2:
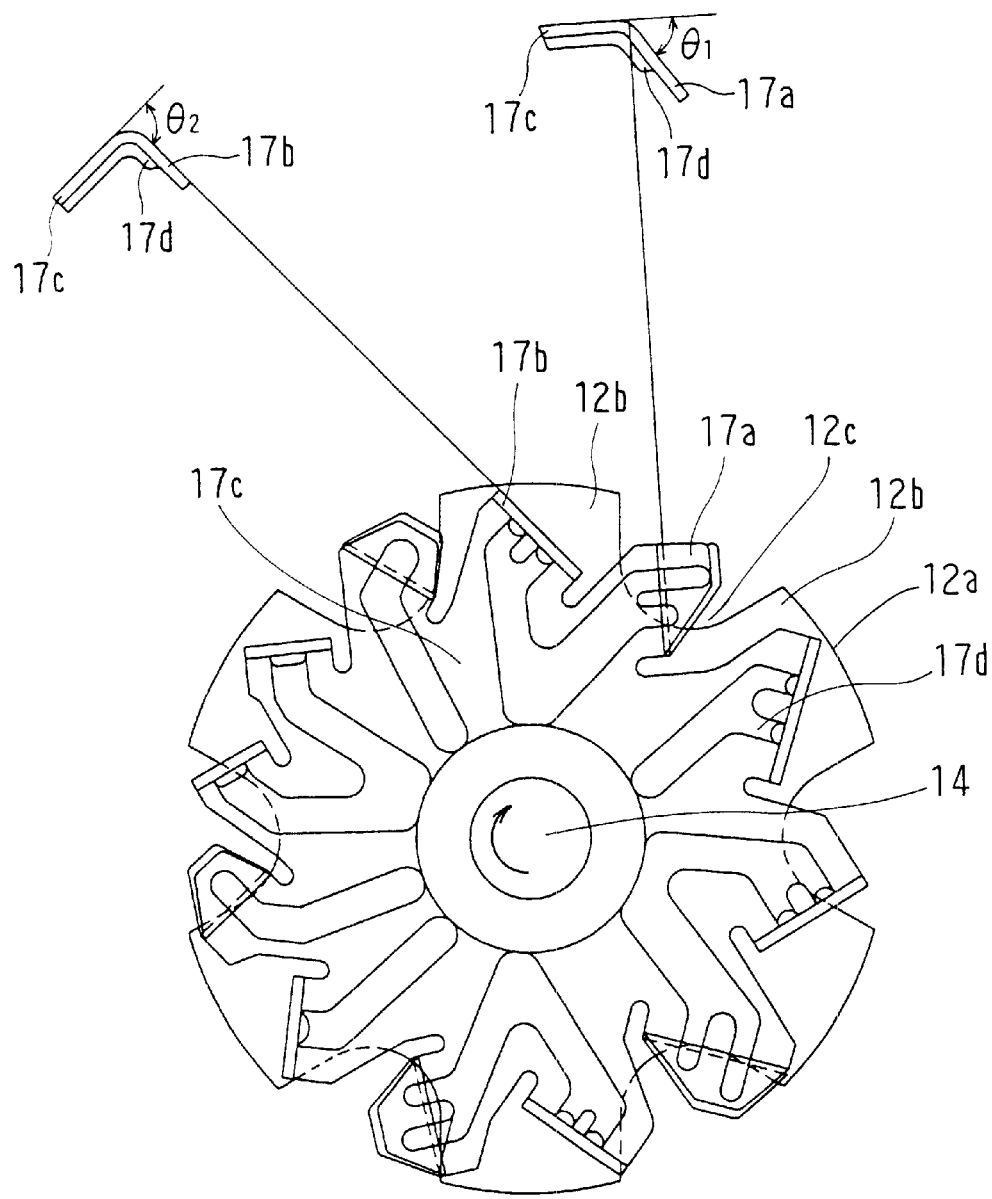
FIG. 2 is a front view of a cooling fan fixed to a rotor of the alternator according to the embodiment of the present invention.

As shown in FIG. 2, the cooling fan 17 has diagonal-flow-type blades 17a and centrifugal-flow-type blades 17b for introducing cooling air through side openings (not shown) of the front housing 1 and blowing the cooling air into the rear housing 2, and a support disc plate 17c for supporting the blades 17a, 17b. A pole core 12 has claw-pole pieces 12a and each of the claw-pole pieces 12a has a shoulder portion 12b. A plurality of V-shaped cooling air passages 12c is provided between adjacent two of the claw-pole pieces 12a in generally axial direction as known well. The diagonal-flow-type blades 17a are provided on an outer circumference of the support disc plate 17c. Each of the diagonal-flow-type blades 17a is positioned at a front end of the V-shaped cooling air passages 12c. Also, each of the diagonal-flow-type blades 17a inclines an angle θ1 (e.g. 50–70°) against the support disc plate 17c toward the rotating direction.

Each of the diagonal-flow-type blades 12a sucks cooling air in the direction parallel with the rotation shaft 14 and blows it toward the field coil 11 in parallel with the rotation shaft 14 and toward the stator coil 5 in the radial direction. The centrifugal-flow-type blades 17b are provided on the outer circumference of the support disc plate 17c. Each of the centrifugal-flow-type blades 17b inclines an angle θ2 (e.g. 90°) against the support disc plate 17c. Each of the centrifugal-flow-type blades 17b sucks cooling air in the direction parallel with the rotation shaft 14 and blows it to the stator coil 5. Convex-shaped support members 17d may be provided on surfaces of the diagonal-flow-type blades 17a, the centrifugal-flow-type blades 17b and the support plate 17c.

The pole core has six claw-pole pieces 12a and the cooling fan 17 has five diagonal-flow-type blades 17a. Therefore, one of the number (six) of the claw-pole pieces 12a and the number (five) of the diagonal-flow-type blades 17a is not divisible by the other, and both numbers have no common divisor other than one. Accordingly, wind noises, which are caused by the diagonal-flow-type blades 17a and the claw-pole pieces 12a while the rotor 9 is operated, do not interfere with each other so that the wind interference noise, which occurs at a predetermined order of frequency and is harsh on ears, is suppressed.

Further, in case the pole core 12 has six claw-pole pieces 12a, for example, the cooling fan 17 may have seven diagonal-flow-type blades 17a, such that one of the numbers is not divisible by the other and both of the numbers have no common divisor other than one. In this case, the number of the V-shaped air passages 12c is six equal to the number of claw-pole pieces 12a. Therefore, at least two blades in seven diagonal-flow-type blades 17a are positioned at the same one of the V-shaped air passage 12c. Further, if the pole core 12 has eight claw-pole pieces 12a, the number of the diagonal-flow-type blades 17a may be three, five, seven, nine or the like.

In the present embodiment, the cooling fan 17 has five diagonal-flow-type blades 17a and seven centrifugal-flow-type blades 17b. Therefore, wind noises caused by two different-type blades 17a, 17b do not interfere with each other so that the wind interference noise harsh on the ears is suppressed. Also, in case the cooling fan has five diagonal-flow-type blades 17a, the number of the centrifugal-flow-type-blades 17b maybe two, three, four, six, seven or the like, which is not divisible by the number (five) of the diagonal-flow-type blades 17a and has no common divisor other than one. Further, if the cooling fan 17 has seven diagonal-flow-type blades 17a, the number of the centrifugal-flow-type blades 17b may be two, three, four, five, six, eight or the like so as to have the same effect.

In the present embodiment, the pole core 12 has six claw-pole pieces 12a and the cooling fan 17 has seven centrifugal-flow-type blades 17b. Therefore, wind noises, which are caused by the claw-pole pieces 12a and the centrifugal-flow-type blades 17b while the rotor 9 is operated, do not interfere with each other so that the wind interference noise harsh on the ears is suppressed. Further, in case the pole core 12 has six claw-pole pieces 12a, the number of the centrifugal-flow-type blades 17b may be five, eleven or the like which is not divisible by the number (six) of the claw-pole pieces 12a and has no common divisor other than one. Furthermore, if the pole core 12 has eight claw-pole pieces 12a, the number of the centrifugal-flow-type blades 17b may be three, five, seven, nine, eleven or the like so as to have the same effect.

Further, in the present embodiment, the stator core 4 has thirty-six teeth (not shown) at an inner periphery thereof. Therefore, the number (thirty-six) of the teeth is divisible by neither the number (seven) of the centrifugal-flow-type blades 17b nor the number (five) of the diagonal-flow-type blades 17a, and has no common divisor therebetween. Accordingly, the wind noises caused by the two different-type blades 17a, 17b do not interfere with each other inside the stator core 4 while the rotor 9 is operated, so that the wind interference noise harsh on the ears is suppressed. Further, in case the stator core 4 has thirty-six teeth and the pole core 12 has six claw-pole pieces 12a, the number of the centrifugal-flow-type blades 17b may be five, eleven or the like as well as the number of the diagonal-flow-type blades 17a may be seven or the like to have the same effect. That is, one of the numbers of the claw-pole pieces 12a, the diagonal-flow-type blades 17a and the centrifugal-flow-type blades 17b is not divisible by the other two numbers, and all the three numbers have no common divisor other than one. Therefore, the interference of wind noises which are caused by two different-type blades 17a, 17b and the claw-pole-pieces 12a while the rotor 9 is operated, may be effectively suppressed.

Furthermore, the diagonal-flow-type blades 17a and the centrifugal-flow-type blades 17b may be provided at irregular angular intervals on the outer circumference of the cooling fan 17 in the rotation direction. Therefore, the wind noises caused by each blade have irregular time intervals, so that the interference of the wind noises are restricted. Thus, a predetermined order of interference which is caused when the two different-type blades are arranged at equal angular intervals, does not occur so that the wind interference noise harsh on the ears is effectively suppressed.

The present invention should not be limited to the disclosed embodiment, but may be implemented in other ways without depending from the spirit of the invention.

What is claimed is:

1. An alternator, comprising:
    a stator having stator coils wound thereon;
    a rotor having a plurality of claw-pole pieces, the rotor being disposed to be rotatable in an inner periphery of the stator; and
    a cooling fan having a plurality of diagonal-flow-type blades for blowing cooling air in axial and radial directions of the rotor, wherein:
        one of a number of the claw-pole pieces and a number of the diagonal-flow-type blades is indivisible by the other, and both of the numbers have no common divisor other than one,
        the cooling fan further comprises a plurality of centrifugal-flow-type blades for blowing cooling air in the radial direction of the rotor, and
        one of the number of claw-pole pieces and the number of centrifugal-flow-type blades is indivisible by the other, and both of the numbers have no common divisor other than one.

2. The alternator as in claim 1, wherein the rotor provides an air passage between adjacent two of the claw-pole pieces, and each of the diagonal-flow-type blades is positioned at the air passage, and inclines by a predetermined angle against an axial end surface of the claw-pole pieces in a rotating direction.

3. The alternator as in claim 1, wherein one of the number of the diagonal-flow-type blades and a number of the centrifugal-flow-type blades is indivisible by the other, and both of the numbers have no common divisor other than one.

4. The alternator as in claim 1, wherein the stator comprises a plurality of teeth, and one of a number of the teeth, the number of the diagonal-flow-type blades and the number of the centrifugal-flow-type blades is indivisible by the other two numbers and those three numbers have no common divisor other than one.

5. The alternator as in claim 1, the diagonal-flow-type blades and the centrifugal-flow-type blades are positioned at irregular angular intervals along a circumference of the rotor.

6. An alternator, comprising:
    a stator having stator coils wound thereon;
    a rotor having a plurality of claw-pole pieces, the rotor being disposed to be rotatable in an inner periphery of the stator; and a cooling fan having a plurality of diagonal-flow-type blades for blowing cooling air in axial and radial directions of the rotor and a plurality of centrifugal-flow-type blades for blowing cooling air in the radial direction of the rotor, wherein one of the number of claw-pole pieces and the number of centrifugal-flow-type blades is indivisible by the other, and both of the numbers have no common divisor other than one.

* * * * *